United States Patent
Tsai et al.

(10) Patent No.: US 8,233,121 B2
(45) Date of Patent: Jul. 31, 2012

(54) DISPLAY PANEL AND COLOR FILTER SUBSTRATE

(75) Inventors: Ming-Yao Tsai, Kaohsiung County (TW); Ching-Sheng Cheng, Kaohsiung County (TW); Chih-Hung Shih, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 223 days.

(21) Appl. No.: 12/822,190

(22) Filed: Jun. 24, 2010

(65) Prior Publication Data

US 2011/0228200 A1   Sep. 22, 2011

(30) Foreign Application Priority Data

Mar. 17, 2010   (TW) ................................ 99107830 A

(51) Int. Cl.
G02F 1/1335   (2006.01)
(52) U.S. Cl. .................. 349/108; 349/106; 349/114
(58) Field of Classification Search .................. 349/106, 349/108, 114
See application file for complete search history.

(56) References Cited

U.S. PATENT DOCUMENTS

| | | |
|---|---|---|
| 2006/0139522 A1 | 6/2006 | Chang et al. |
| 2006/0187386 A1 | 8/2006 | Roh |
| 2006/0274234 A1* | 12/2006 | Takizawa ..................... 349/108 |
| 2007/0164953 A1 | 7/2007 | Huang et al. |
| 2008/0084376 A1 | 4/2008 | Hirota et al. |

FOREIGN PATENT DOCUMENTS

| | | |
|---|---|---|
| CN | 1892350 | 1/2007 |
| CN | 101377584 | 3/2009 |
| JP | 2004191646 | 7/2004 |

OTHER PUBLICATIONS

"First Office Action of China Counterpart Application", issued on Jan. 31, 2011, p1-p5, in which the listed references were cited.

* cited by examiner

*Primary Examiner* — Phu Vu
(74) *Attorney, Agent, or Firm* — Jianq Chyun IP Office

(57) ABSTRACT

A display panel having a reflective region and a transparent region is provided. The reflective region and the transparent region respectively have sub-pixel regions. The display panel includes a first substrate, a second substrate, a plurality of color filter patterns, a single complementary color filter pattern and a display medium. The first substrate has a plurality of pixel structures disposed corresponding to the sub-pixel regions. The second substrate is disposed opposite to the first substrate. The color filter patterns are respectively disposed in the sub-pixel regions of the transparent region on the first or second substrate. The single complementary color filter pattern is disposed in the sub-pixel regions of the reflective region on the first or second substrate. The sub-pixel regions of the reflective region are not completely covered by the single complementary color filter pattern. The display medium is disposed between the first substrate and second substrate.

15 Claims, 5 Drawing Sheets

DISPLAY PANEL AND COLOR FILTER SUBSTRATE

CROSS-REFERENCE TO RELATED APPLICATION

This application claims the priority benefit of Taiwan application serial no. 99107830, filed on Mar. 17, 2010. The entirety of the above-mentioned patent application is hereby incorporated by reference herein and made a part of this specification.

BACKGROUND OF THE INVENTION

1. Field of the Invention

The invention relates to a display panel and a color filter substrate thereof, and more particularly to a display panel capable of improving yellow-shift image and a color filter substrate thereof.

2. Description of Related Art

In current society, the development of multi-media technologies relies much on the progress of semiconductor devices or display apparatuses. As for displays, LCDs with advantages such as high definition, favorable space utilization, low power consumption and radiation-free operation have gradually become the mainstream of the market. Generally, the LCDs can be classified as transmissive LCDs, reflective LCDs, and transflective LCDs. The transflective LCDs can be used under either sufficient or insufficient illumination, and thus have a wide application scope.

A transflective LCD displays images by using a back light source and an external light source simultaneously. Generally, a transflective LCD includes a pixel array substrate, an opposite substrate, and a liquid crystal layer sandwiched therebetween. A pixel structure on the pixel array substrate has a transparent region and a reflective region. Moreover, a transparent pixel electrode is disposed in the transparent region and a reflective pixel electrode is disposed in the reflective region.

Currently, a type of transflective LCD displays full-color images with a transparent mode and displays black and white images with a reflective mode. Usually, a reflective layer with protruding structures is used in the reflective region for the environmental light to spread uniformly, such that the image is displayed normally from every viewing angle. Nevertheless, this transflective LCD usually has a disadvantage of displaying black and white reflective images with yellow-shift.

SUMMARY OF THE INVENTION

The invention relates to a display panel and a color filter substrate thereof, the display panel is capable of improving black and white reflective images with yellow-shift in traditional transflective display panels.

The invention is directed to a display panel having a reflective region and a transparent region. The reflective region and the transparent region respectively have a plurality of sub-pixel regions. The display panel includes a first substrate, a second substrate, a plurality of color filter patterns, a single complementary color filter pattern, and a display medium. The first substrate has a plurality of pixel structures, where the pixel structures are disposed corresponding to the sub-pixel regions. The second substrate is disposed opposite to the first substrate. The color filter patterns are respectively disposed in the sub-pixel regions of the transparent region on the first substrate or the second substrate. The foregoing single complementary color filter pattern is disposed in the sub-pixel regions of the reflective region on the first substrate or the second substrate. The sub-pixel regions of the reflective region are not completely covered by the complementary color filter pattern. The display medium is sandwiched between the first substrate and the second substrate.

The invention is directed to a color filter substrate including a substrate, a plurality of color filter patterns, and a single complementary color filter pattern. The substrate has a reflective region and a transparent region. The reflective region and the transparent region respectively have a plurality of sub-pixel regions. The color filter patterns are respectively disposed in the sub-pixel regions of the transparent region on the substrate. The single complementary color filter pattern is disposed in the sub-pixel regions of the reflective region on the substrate. The sub-pixel regions of the reflective region are not completely covered by the complementary color filter pattern.

In light of the foregoing, the complementary color filter pattern is disposed in the sub-pixel regions of the reflective region, and the yellow-shift image is thus adjusted to a white image for improving the black and white reflective image with yellow-shift of the transflective LCD.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
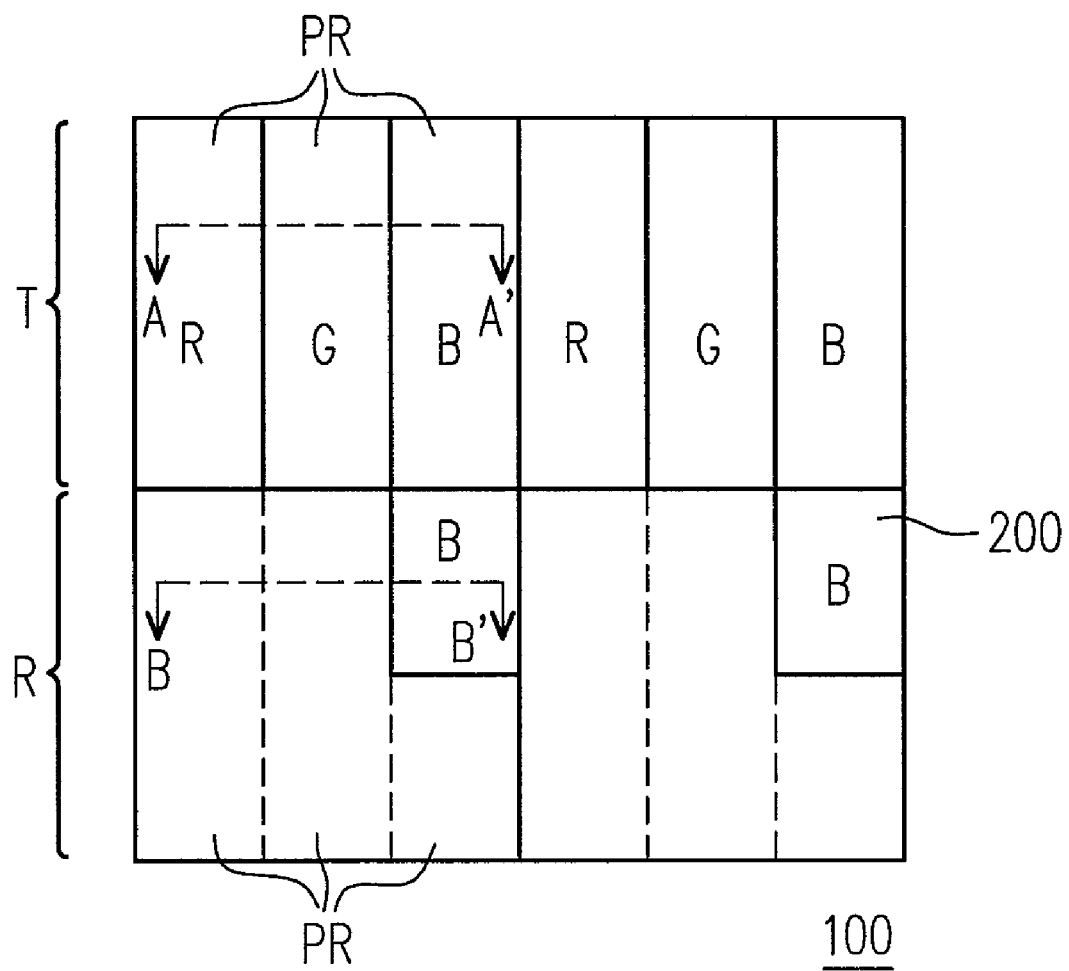
FIG. 1 is a schematic top view of a display panel according to an embodiment of the invention.
Figure 2:
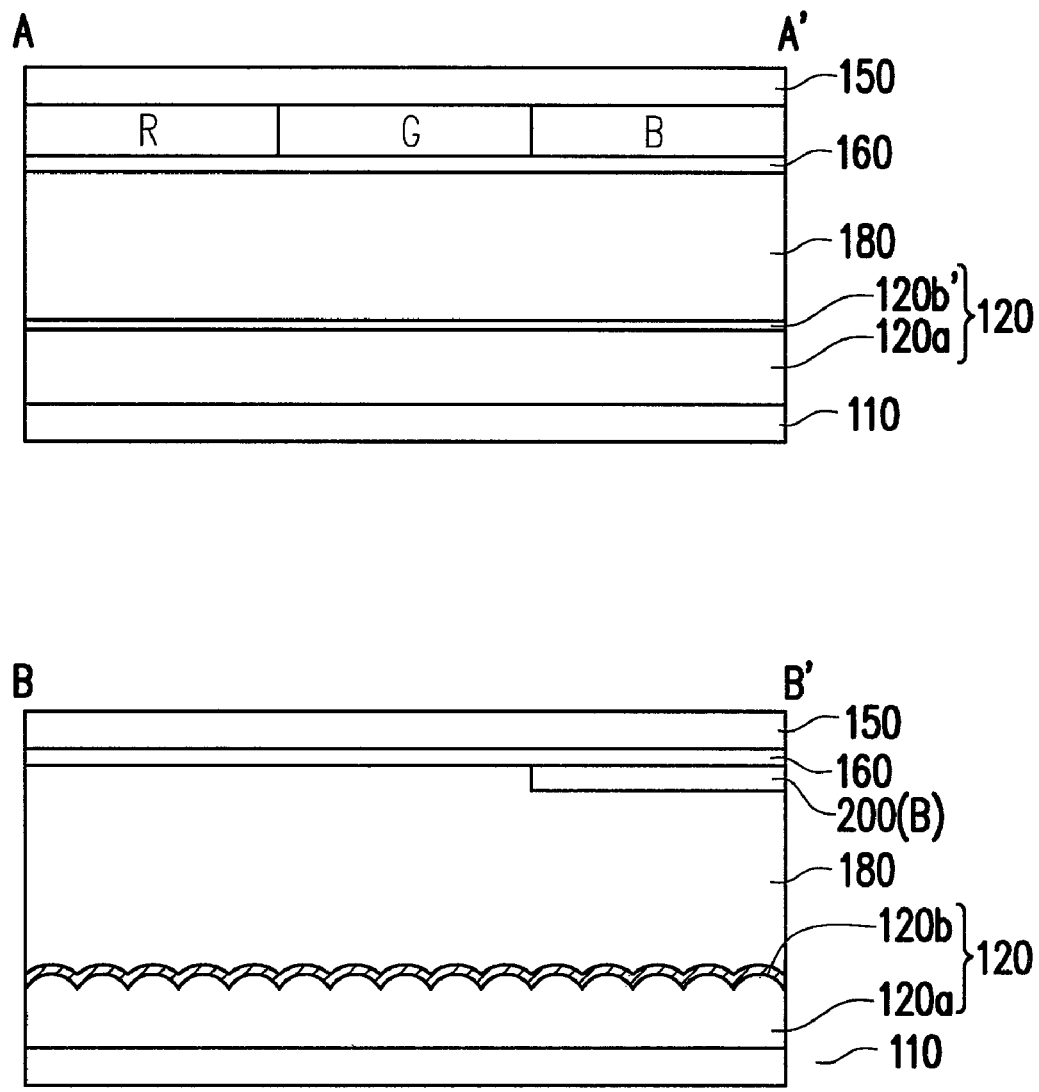
FIG. 2 is a cross-sectional view along lines A-A' and B-B' in FIG. 1.

FIG. 1 is a schematic top view of a display panel according to an embodiment of the invention. FIG. 2 is a cross-sectional view along lines A-A' and B-B' in FIG. 1. Referring to FIGS. 1 and 2, a display panel 100 of the present embodiment has a reflective region R and a transparent region T. The reflective region R and the transparent region T respectively have a plurality of sub-pixel regions PR. The display panel 100 includes a first substrate 110, a second substrate 150, a plurality of color filter patterns R, G, B, a single complementary color filter pattern 200, and a display medium 180.

Figure 3:
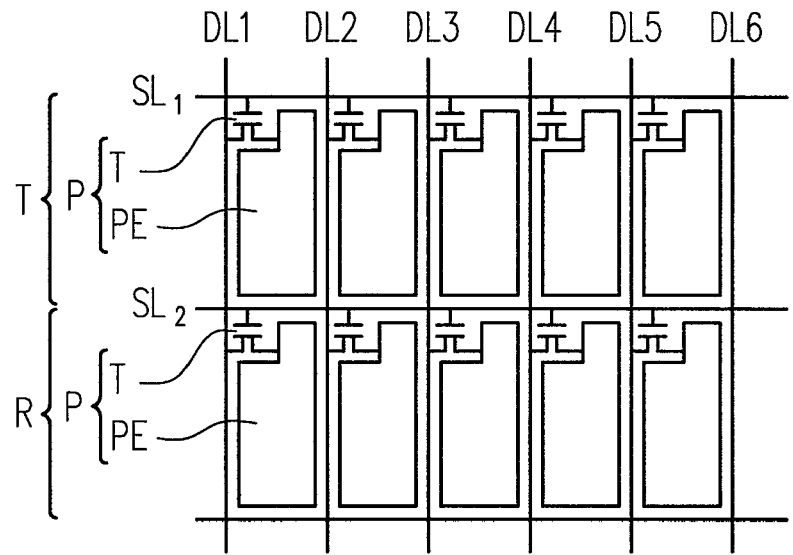
FIG. 3 is a schematic top view of a pixel array layer 120 depicted in FIG. 2.

The first substrate 110 is a transparent substrate such as a transparent glass substrate or a transparent flexible substrate. The first substrate 110 has a pixel array layer 120. A schematic top view of the pixel array layer 120 of the present embodiment is depicted in FIG. 3. As shown in FIG. 3, the pixel array layer 120 has a plurality of scan lines SL1-SL2, a plurality of data lines DL1-DL6, and a plurality of pixel structures P. Moreover, each pixel structure P is disposed corresponding to one of the sub-pixel regions PR. According to the present embodiment, each pixel structure P has an active device T and a pixel electrode PE. The active device T (located in an active device layer 120a) is a bottom-gate thin film transistor (TFT), for example, and includes a gate, a channel, a source, and a drain. The gate is electrically connected to the scan line SL1 or SL2. The channel is disposed above the gate. The source and the drain are disposed above the channel, where the source is electrically connected to one of the data lines DL1-DL6. According to another embodiment, the active device can be a top-gate TFT. The pixel electrode PE in the reflective region R (located in a pixel electrode layer 120b) is a reflective pixel electrode (that is, a non-transparent pixel electrode). The pixel electrode PE in the transparent region T (located in a pixel electrode layer 120b') is a transparent pixel electrode (that is, a transparent pixel electrode). According to the present embodiment, a protrusion structure is further designed under the pixel electrode layer 120b (the pixel electrode PE) of the reflective region R, such that every viewing angle of the reflective region R has superior displaying effect.

It should be noted that in the present embodiment, each of the pixel structures P is disposed in one of the sub-pixel regions PR correspondingly. Thus, the pixel structures P in the transparent region T and the pixel structures P in the reflective region R are arranged alternately to constitute the transflective pixel array layer 120. However, the invention is not limited thereto. According to other embodiments, the pixel structure P can be disposed in the transparent region T and the reflective region R simultaneously, so that each pixel structure P is a transflective pixel structure. In other words, the pixel structure P in one sub-pixel region PR includes the active device T and the pixel electrode PE. Here, a portion of the pixel electrode PE is a reflective pixel electrode and another portion of the pixel electrode PE is a transparent pixel electrode.

The second substrate 150 is disposed opposite to the first substrate 110. The second substrate 150 is a transparent substrate such as a transparent glass substrate or a transparent flexible substrate.

The display medium 180 is sandwiched between the first substrate 110 and the second substrate 150. The display medium 180 is a liquid crystal display medium or an electrophoretic display medium.

The color filter patterns R, G, B (red color filter patterns, green color filter patterns and blue color filter patterns) are respectively disposed in the sub-pixel regions PR of the transparent region T on the first substrate 110 or the second substrate 150. In the embodiments of FIGS. 1 and 2, the color filter patterns R, G, B are respectively disposed in the sub-pixel regions PR of the transparent region T on the second substrate 150. Since the color filter patterns R, G, B are disposed on the second substrate 150, the second substrate 150 depicted in FIG. 2 and a layer formed on the second substrate 150 can be referred as the color filter substrate. However, the invention is not limited thereto. According to other embodiments, the color filter patterns R, G, B can also be disposed in the sub-pixel regions PR of the transparent region T on the first substrate 110 to constitute a color filter on array (COA) structure. In addition, according to an embodiment, a shielding pattern layer (not shown) is further formed between the foregoing color filter patterns R, G, B. The shielding pattern layer can also be referred as a black matrix (BM). In the present embodiment, an electrode layer 160 is further disposed on the second substrate 150 to cover the color filter patterns R, G, B.

The single complementary color filter pattern 200 is disposed in the sub-pixel regions PR of the reflective region R on the first substrate 110 or the second substrate 150. The complementary color filter pattern 200 is mainly adopted for complement. In the embodiments of FIGS. 1 and 2, the complementary color filter pattern 200 is disposed in the sub-pixel regions PR of the reflective region R on the second substrate 150. The sub-pixel regions PR of the reflective region R are not completely covered by the complementary color filter pattern 200. Nonetheless, the invention is not limited herein. According to other embodiments, the single complementary color filter pattern 200 can also be disposed in the sub-pixel regions PR of the reflective region R on the first substrate 110. Additionally, in the embodiments of FIGS. 1 and 2, the single complementary color filter pattern 200 is disposed in the sub-pixel regions PR of the reflective region R on the second substrate 150 and covers the electrode layer 160. However, when the single complementary color filter pattern 200 is disposed in the sub-pixel regions PR of the reflective region R on the second substrate 150 depending on the design, the electrode layer 160 may cover the complementary color filter pattern 200 (not shown). Nonetheless, the invention is not limited herein. According to other embodiments, the complementary color filter pattern 200 can also be disposed in the sub-pixel regions PR of the reflective region R on the first substrate 110, where the electrode layer 120b covers the complementary color filter pattern 200 (not shown). Moreover, in the embodiments of FIGS. 1 and 2, the complementary color filter patterns 200 in the reflective region R are disposed corresponding to the blue color filter patterns B of the transparent region T. In other words, in the embodiments of FIGS. 1 and 2, the sub-pixel regions PR (located in the reflective region R) corresponding to the red color filter patterns R and the green color filter patterns G are not disposed with any filter patterns.

Notably, in the embodiments of FIGS. 1 and 2, the complementary color filter pattern 200 is illustrated using the blue color filter pattern B as an example. When a black and white reflective image of the transflective LCD appears yellow-shift, the contrast color of yellow (that is, blue) is used for adjusting the yellow-shift black and white reflective image to a white image. Therefore, the invention does not limit the complementary color filter pattern 200 to be blue. The color of the complementary color filter pattern 200 is mainly selected based on the color shift of the black and white reflective image of the transflective LCD. Thus, in other embodiments, the complementary color filter pattern 200 can also be a red color filter pattern or a green color filter pattern.

Referring to FIG. 1, in the present embodiment, the complementary color filter pattern 200 does not cover the sub-pixel regions PR of the reflective region R completely. When different display images are optimized, the complementary color filter patterns 200 then have different areas. Take the white image as an example, this complementary color filter pattern 200 occupies about 30%-100% of the area of the sub-pixel regions PR of the reflective region R. Since the complementary color filter pattern 200 is mainly used for complement, when the complementary color filter pattern 200 occupies an overlarge area in the sub-pixel regions PR of the reflective region R, the black and white reflective image of the transflective LCD may be over-complemented so as to result in another type of color shift. When the complementary color filter pattern 200 occupies a small area in the sub-pixel regions PR of the reflective region R, the complement may not be as effective.

Figure 4:
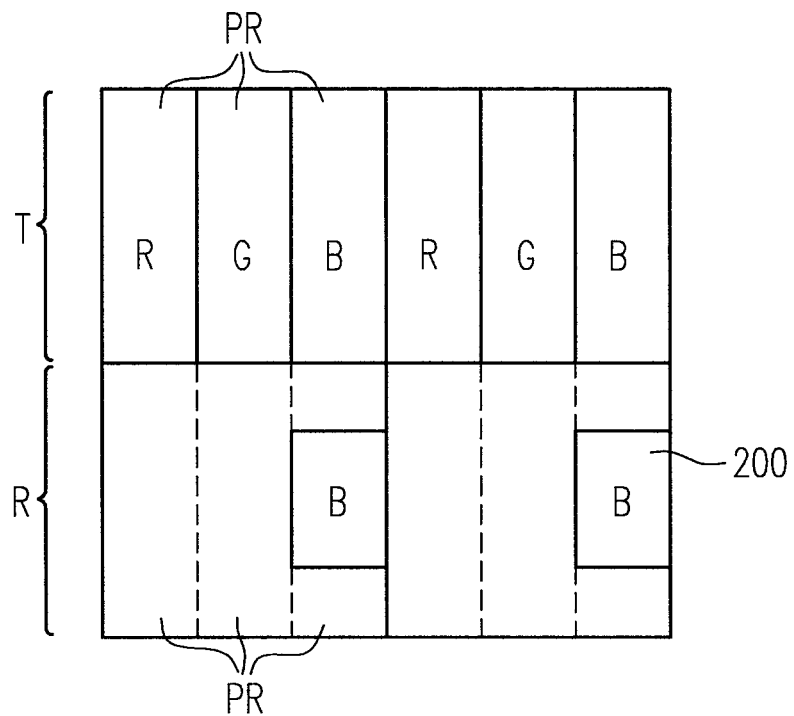
FIG. 4 is a schematic top view of a display panel according to an embodiment of the invention.

FIG. 4 is a schematic top view of a display panel according to an embodiment of the invention. Referring to FIG. 4, the embodiment shown in FIG. 4 is similar to the embodiment shown in FIG. 1 so that components identical to those of FIG. 1 will be denoted with the same numerals in FIG. 4 and not repeated herein. The embodiment of FIG. 4 is different from the embodiment of FIG. 1 in that the complementary color filter patterns 200 (i.e. the blue color filter patterns B) disposed in the sub-pixel regions PR of the reflective region R are not directly adjacent to the color filter patterns R, G, B in the transparent region T. Favorably, the complementary color filter patterns 200 (i.e. the blue color filter patterns B) are disposed in a middle region of the sub-pixel regions PR of the reflective region R.

Figure 5:
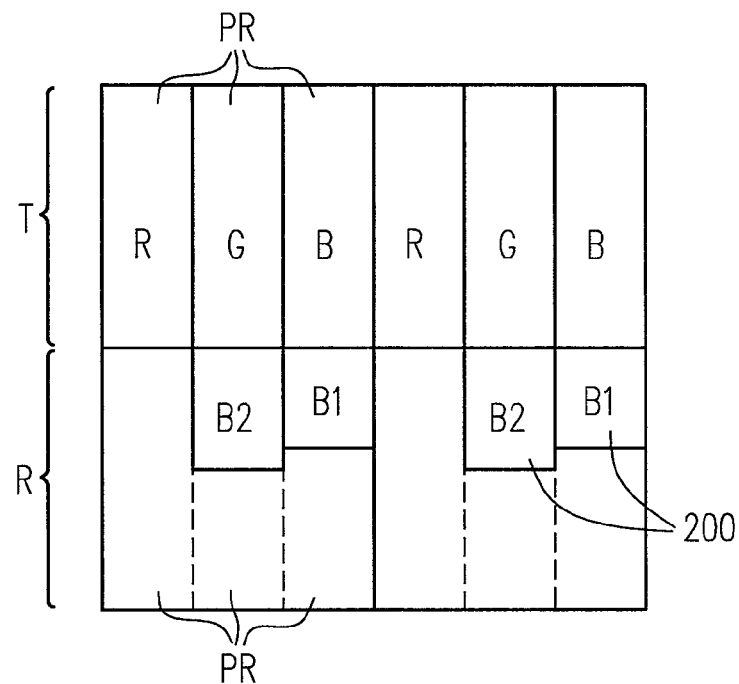
FIG. 5 is a schematic top view of a display panel according to an embodiment of the invention.

FIG. 5 is a schematic top view of a display panel according to an embodiment of the invention. Referring to FIG. 5, the embodiment shown in FIG. 5 is similar to the embodiment shown in FIG. 1 so that components identical to those of FIG. 1 will be denoted with the same numerals in FIG. 5 and not repeated herein. The embodiment of FIG. 5 is different from the embodiment of FIG. 1 in that the complementary color filter patterns 200 (i.e. blue color filter patterns B1, B2) of the reflective region R are disposed corresponding to the blue color filter patterns B and the green color filter patterns G of the transparent region T. Favorably, the area of the complementary color filter patterns 200 (the blue color filter patterns B1) disposed corresponding to the blue color filter patterns B of the transparent region T is smaller than the area of the complementary color filter patterns 200 (the blue color filter patterns B2) disposed corresponding to the green color filter patterns G of the transparent region T. Therefore, in the embodiment of FIG. 5, the sub-pixel regions PR (of the reflective region R) corresponding to the red color filter patterns R of the transparent region T are not disposed with any filter patterns. Here, the ratio of the area of the complementary color filter patterns 200 (the blue color filter patterns B1) disposed corresponding to the blue color filter patterns B of the transparent region T to the area of the complementary color filter patterns 200 (the blue color filter patterns B2) disposed corresponding to the green color filter patterns G of the transparent region T (that is, the area of B1:the area of B2) varies upon the use of different materials. However, the ratio usually ranges from 1:2 to 1:7.

Figure 6:
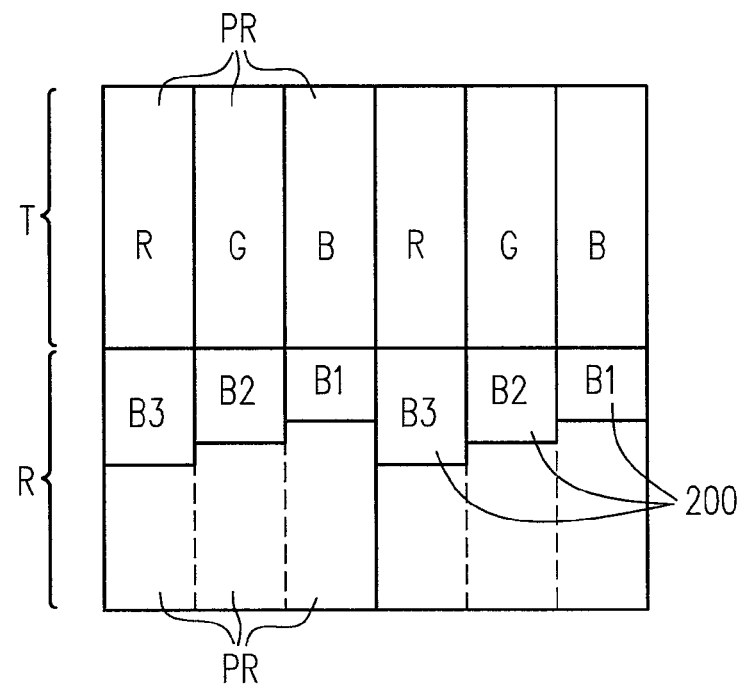
FIG. 6 is a schematic top view of a display panel according to an embodiment of the invention.

FIG. 6 is a schematic top view of a display panel according to another embodiment of the invention. Referring to FIG. 6, the embodiment shown in FIG. 6 is similar to the embodiment shown in FIG. 1 so that components identical to those of FIG. 1 will be denoted with the same numerals in FIG. 6 and not repeated herein. The embodiment of FIG. 6 is different from the embodiment of FIG. 1 in that the complementary color filter patterns 200 (i.e. the blue color filter patterns B1, B2, B3) of the reflective region R are disposed corresponding to the blue color filter patterns B, the green color filter patterns G, and the red color filter patterns R of the transparent region T. Favorably, the area of the complementary color filter patterns 200 (the blue color filter patterns B1) disposed corresponding to the blue color filter patterns B of the transparent region T is smaller than the area of the complementary color filter patterns 200 (the blue color filter patterns B2) disposed corresponding to the green color filter patterns G of the transparent region T. Further, the area of the complementary color filter patterns 200 (the blue color filter patterns B2) disposed corresponding to the green color filter patterns G of the transparent region T is smaller than the area of the complementary color filter patterns 200 (the blue color filter patterns B3) disposed corresponding to the red color filter patterns R of the transparent region T.

In the embodiment of FIG. 6, the ratio of the area of the complementary color filter patterns 200 (the blue color filter patterns B1) disposed corresponding to the blue color filter patterns B of the transparent region T to the area of the complementary color filter patterns 200 (the blue color filter patterns B2) disposed corresponding to the green color filter patterns G of the transparent region T to the area of the complementary color filter patterns 200 (the blue color filter patterns B3) disposed corresponding to the red color filter patterns R of the transparent region T (that is, the area of B1:the area of B2:the area of B3) is about 0.2:0.7:0.1. Specifically, the ratio of the area occupied by the complementary color filter patterns 200 of the reflective region R is determined by the material used to fabricate the color filter patterns R, G, B of the transparent region T. For example, when the ratio of the transmittance of the color filter patterns R, G, B of the transparent region T is 0.2:0.7:0.1, then the ratio of the area of the complementary color filter patterns 200 (the blue color filter patterns B) of the reflective region R is 0.2:0.7:0.1. Moreover, when the display panel has blue shift, then the ratio of the complementary color filter patterns 200 (the blue color filter patterns B) can be adjusted to reduce this blue shift effect. Here, the ratio is, for example, 0.2025:0.7025:0.095.

Figure 7:
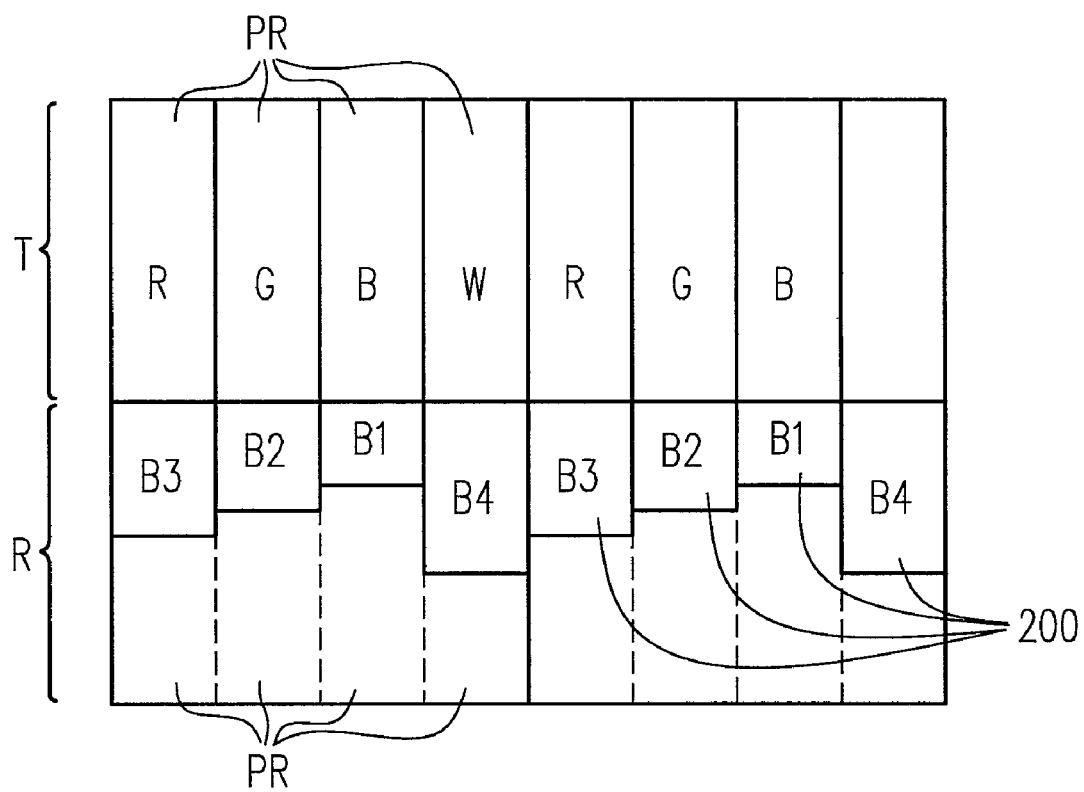
FIG. 7 is a schematic top view of a display panel according to an embodiment of the invention.

FIG. 7 is a schematic top view of a display panel according to another embodiment of the invention. Referring to FIG. 7, the embodiment shown in FIG. 7 is similar to the embodiment shown in FIG. 6 so that components identical to those of FIG. 6 will be denoted with the same numerals in FIG. 7 and not repeated herein. The embodiment of FIG. 7 is different from the embodiment of FIG. 6 in that the color filter patterns of the transparent region T include red, green, blue, and white color filter patterns R, G, B, W. In addition, the complementary color filter patterns 200 (the blue color filter patterns B1, B2, B3, B4) of the reflective region R are disposed corresponding to the blue color filter patterns B, the green color filter patterns G, the red color filter patterns R, and the white color filter patterns W of the transparent region T.

Favorably, the area of the complementary color filter patterns 200 (the blue color filter patterns B1) disposed corresponding to the blue color filter patterns B of the transparent region T is smaller than the area of the complementary color filter patterns 200 (the blue color filter patterns B2) disposed corresponding to the green color filter patterns G of the transparent region T. Further, the area of the complementary color filter patterns 200 (the blue color filter patterns B2) disposed corresponding to the green color filter patterns G of the transparent region T is smaller than the area of the complementary color filter patterns 200 (the blue color filter patterns B3) disposed corresponding to the red color filter patterns R of the transparent region T. Also, the area of the complementary color filter patterns 200 (the blue color filter patterns B3) disposed corresponding to the red color filter patterns R of the transparent region T is smaller than the area of the complementary color filter patterns 200 (the blue color filter patterns B4) disposed corresponding to the white color filter patterns W of the transparent region T.

It should be noted that, in the embodiments of FIGS. 5 and 7, the complementary color filter patterns 200 are all disposed adjacent to the color filter patterns R, G, B (and W) of the transparent region T. However, the invention is not limited thereto. According to other embodiments, the complementary color filter patterns 200 in the sub-pixel regions PR of the reflective region R may not be disposed directly adjacent to the color filter patterns R, G, B of the transparent region T. In other words, the foregoing placement is similar to the placement of the complementary color filter patterns 200 illustrated in FIG. 4. That is, the complementary color filter patterns 200 are disposed in the middle region or other regions of the sub-pixel regions PR of the reflective region R.

In summary, the complementary color filter pattern is disposed in the sub-pixel regions of the reflective region in the invention, such that the color shift (i.e. yellow shift) of the black and white reflective image can be adjusted to a white image so as to improve the color shift (i.e. yellow shift) of the black and white reflective image of the transflective LCD.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display panel having a reflective region and a transparent region, and the reflective region and the transparent region respectively having a plurality of sub-pixel regions, the display panel comprising:
    a first substrate having a plurality of pixel structures disposed corresponding to the sub-pixel regions;
    a second substrate disposed opposite to the first substrate;
    a plurality of color filter patterns, respectively disposed in the sub-pixel regions of the transparent region on the first substrate or the second substrate;
    a single complementary color filter pattern disposed in the sub-pixel regions of the reflective region on the first substrate or the second substrate, wherein the sub-pixel regions of the reflective region are not completely covered by the complementary color filter pattern; and
    a display medium, sandwiched between the first substrate and the second substrate.

2. The display panel as claimed in claim 1, wherein the complementary color filter pattern occupies 30%~100% of an area of the sub-pixel regions of the reflective region.

3. The display panel as claimed in claim 1, wherein the complementary color filter pattern in the sub-pixel regions of the reflective region is not disposed directly adjacent to the color filter patterns.

4. The display panel as claimed in claim 3, wherein the complementary color filter pattern is disposed in a middle region of the sub-pixel regions of the reflective region.

5. The display panel as claimed in claim 1, wherein the color filter patterns in the sub-pixel regions of the transparent region comprises a plurality of red color filter patterns, a plurality of blue color filter patterns, and a plurality of green color filter patterns.

6. The display panel as claimed in claim 5, wherein the complementary color filter pattern in the sub-pixel regions of the reflective region is a blue color filter pattern.

7. The display panel as claimed in claim 5, wherein the complementary color filter pattern is disposed corresponding to the blue color filter patterns.

8. The display panel as claimed in claim 5, wherein the complementary color filter pattern is disposed corresponding to the blue color filter patterns and the green color filter patterns.

9. The display panel as claimed in claim 8, wherein an area of the complementary color filter pattern disposed corresponding to the blue color filter patterns is smaller than an area of the complementary color filter pattern disposed corresponding to the green color filter patterns.

10. The display panel as claimed in claim 5, wherein the complementary color filter pattern is disposed corresponding to the blue color filter patterns, the green color filter patterns, and the red color filter patterns.

11. The display panel as claimed in claim 10, wherein an area of the complementary color filter pattern disposed corresponding to the blue color filter patterns is smaller than an area of the complementary color filter pattern disposed corresponding to the green color filter patterns, and the area of the complementary color filter pattern disposed corresponding to the green color filter patterns is smaller than an area of the complementary color filter pattern disposed corresponding to the red color filter patterns.

12. The display panel as claimed in claim 5, wherein the color filter patterns in the sub-pixel regions of the transparent region further comprise a plurality of white color filter patterns.

13. The display panel as claimed in claim 12, wherein the complementary color filter pattern is disposed corresponding to the white color filter patterns, the blue color filter patterns, the green color filter patterns, and the red color filter patterns.

14. The display panel as claimed in claim 13, wherein an area of the complementary color filter pattern disposed corresponding to the blue color filter patterns is smaller than an area of the complementary color filter pattern disposed corresponding to the green color filter patterns, the area of the complementary color filter pattern disposed corresponding to the green color filter patterns is smaller than an area of the complementary color filter pattern disposed corresponding to the red color filter patterns, and the area of the complementary color filter pattern is smaller than an area of the complementary color filter pattern disposed corresponding to the white color filter patterns.

15. A color filter substrate, comprising:
    a substrate, having a reflective region and a transparent region, the reflective region and the transparent region respectively having a plurality of sub-pixel regions;
    a plurality of color filter patterns, respectively disposed in the sub-pixel regions of the transparent region on the substrate; and
    a single complementary color filter pattern disposed in the sub-pixel regions of the reflective region on the substrate, wherein the sub-pixel regions of the reflective region are not completely covered by the single complementary color filter pattern.

* * * * *